United States Patent [19]
Martin

[11] 4,255,107
[45] Mar. 10, 1981

[54] CONTROL APPARATUS FOR PRODUCING UNIFORM THICKNESS CORRUGATED TUBING

[75] Inventor: Larry L. Martin, Hamilton, Ohio

[73] Assignee: Advanced Drainage Systems, Inc., Columbus, Ohio

[21] Appl. No.: 909,623

[22] Filed: May 26, 1978

[51] Int. Cl.² ............ B29C 17/07; B29D 23/18
[52] U.S. Cl. ................ 425/163; 264/508; 425/155; 425/168; 425/326.1
[58] Field of Search ............ 264/508, DIG. 52; 425/155, 532, 539, 326.1, 150, 163, 168, 336

[56] References Cited
U.S. PATENT DOCUMENTS

| | | | |
|---|---|---|---|
| 2,940,126 | 6/1960 | Sheridan | 425/326.1 X |
| 3,019,481 | 2/1962 | Negoro | 425/539 X |
| 3,349,156 | 10/1967 | Zieg | 264/508 |
| 3,674,404 | 7/1972 | Burlis et al. | 425/326.1 |
| 4,136,143 | 1/1979 | Lupke et al. | 425/532 X |

FOREIGN PATENT DOCUMENTS 486693   5/1977   Australia .................. 264/508

*Primary Examiner*—Jan H. Silbaugh
*Attorney, Agent, or Firm*—Connolly and Hutz

[57] ABSTRACT

Apparatus and method for producing thermoplastic corrugated tubing having substantially uniform thickness throughout comprises extruder and step of forming hollow smooth-walled extrudate. Corrugating structure immediately adjacent extruder is arranged to receive extrudate and to form corrugations therein. Such structure includes continuously moving cooperating mold blocks configured to form alternating annular peak portions, valley portions and interconnecting side wall portions in extrudate when it is blown into intimate engagement with configured mold blocks. Thickness of extrudate being corrugated is controlled to provide relatively thin extrudate portions during formation of annular valley portions and relatively thick extrudate portions during formation of annular peak and interconnecting side wall portions.

7 Claims, 9 Drawing Figures

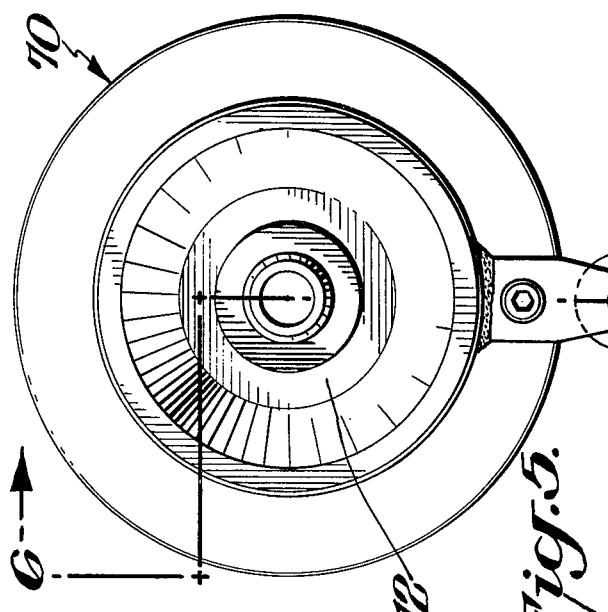
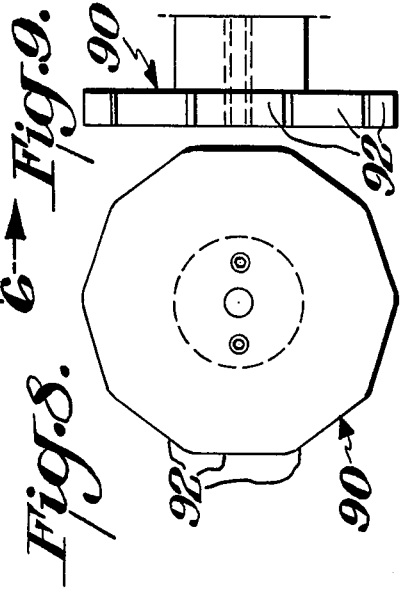
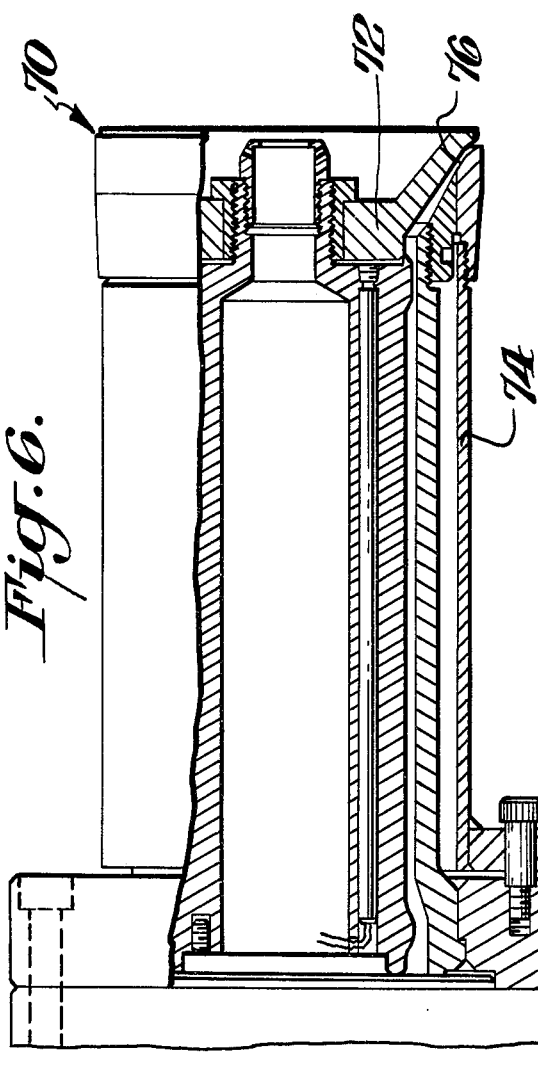
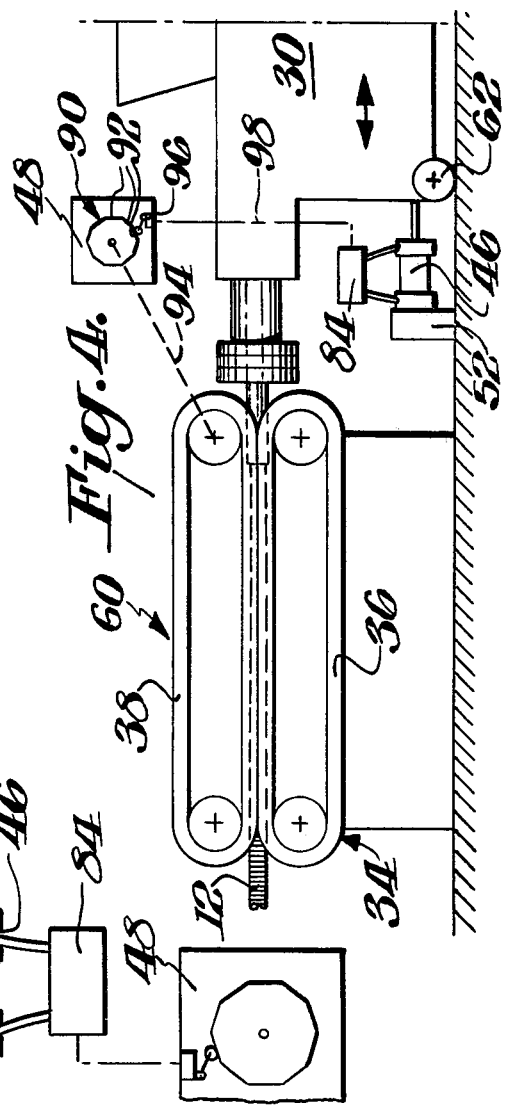

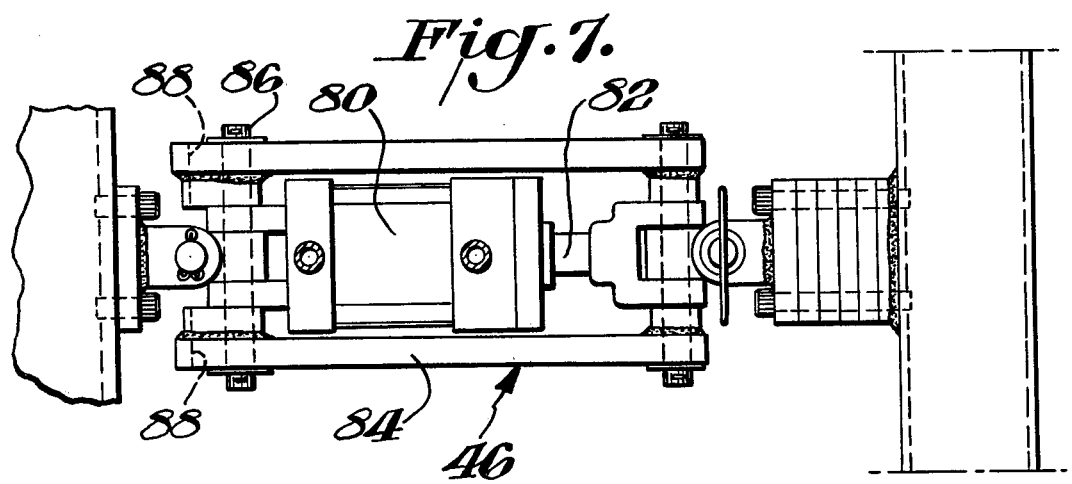

CONTROL APPARATUS FOR PRODUCING UNIFORM THICKNESS CORRUGATED TUBING

BACKGROUND OF THE INVENTION

The present invention relates to a control method and apparatus for producing corrugated tubing, and more particularly to a method and apparatus for producing thermoplastic corrugated tubing having a substantially uniform thickness throughout.

In the formation of corrugated thermoplastic tubing, a hollow smooth-walled extrudate is usually formed by extrusion techniques well known in the art. A corrugator immediately downstream from the extruder receives the extrudate and reforms the shape thereof by providing a corrugated configuration. Generally, the corrugator comprises continuously moving mold blocks that mate with one another to form a molding zone where the corrugating step takes place. Differential air pressure is provided to urge the extrudate into intimate engagement with the configured surfaces of the mold blocks. These blocks are configured to form alternating annular peak portions, valley portions and interconnecting side wall portions in the extrudate formed by the extruder. Unfortunately, utilization of this normal procedure produces corrugated tubing having a variable wall thickness. The overall strength and weight distribution in the finished product varies in relationship to the varying wall thickness of the product.

Utilizing normal production techniques, such as described above, the minor diameter or valley portion of the corrugation is much thicker than desired. Also, the major diameter of the tubing or peak portion together with the interconnecting side walls are thinner than desired. Hence, apparatus and procedure for thinning out the ordinarily thick valley portions of the tubing and adding to the ordinarily thin peak and side wall portions is desirable from the standpoint of a finished product of substantial uniform thickness. Stronger tubing at lighter weight is produced.

SUMMARY OF THE INVENTION

Accordingly, it is an object of the present invention to provide method and apparatus for producing uniform thickness corrugated tubing.

Another object of the present invention is method and apparatus for producing corrugated tubing having uniform strength and weight distribution.

Still another object of the present invention is method and apparatus for producing uniform thickness corrugated tubing wherein the cooling rate of the tubing is improved due to more even wall thickness.

In accordance with the present invention, apparatus is provided for producing thermoplastic corrugated tubing having a substantially uniform thickness throughout. Such apparatus comprises an extruder forming a hollow smooth-walled extrudate with corrugating structure immediately adjacent the extruder arranged to receive the extrudate and to form corrugations therein. The corrugating structure includes continuously moving cooperating mold blocks configured to form alternating annular peak portions, valley portions and interconnecting side wall portions in the extrudate. Differential air pressure urges the extrudate into intimate engagement with the configured mold blocks. The thickness of the extrudate being corrugated is accurately controlled to provide relatively thin extrudate portions during formation of the annular valley portions and relatively thick extrudate portions during formation of the annular peak and interconnecting side wall portions.

The structure for controlling the thickness of the extrudate being corrugated may include a motivating mechanism connected to move the extruder and the corrugating structure toward and away from one another. A timing device connected to the motivating mechanism is arranged to cause the extruder and the corrugating structure to slightly move away from one another during formation of the annular valley portions of the tubing and to slightly move toward one another during formation of the annular peak and interconnecting side wall portions.

Alternatively, the structure for controlling the thickness of the extrudate being corrugated may include a variable die on the extruder with a motivating mechanism connected to vary the die opening to form an extrudate having alternating relatively thin and thick wall dimensions. A timing device connected to the motivating mechanism is arranged to cause the die opening to slightly close during formation of the annular valley portions of the tubing and to slightly open during formation of the annular peak and interconnecting side wall portions.

In the embodiments of the invention where the motivating mechanism moves the corrugating structure and the extruder toward and away from one another, the extruder may be fixed in place and the corrugating structure arranged to repeatedly move toward and away from the stationary extruder. Wheels may be rotatably mounted to the underside of the corrugating structure, and a hydraulic cylinder and piston may be interconnected between a fixed location and the corrugating structure to effect the desired relative movement.

Alternatively, the corrugating structure may be fixed in place with the extruder arranged to repeatedly move toward and away from the corrugating structure. Wheels may be rotatably mounted to the underside of the extruder and a hydraulic cylinder and piston may be interconnected between a fixed location and the extruder to effect the desired relative movement.

In the embodiments of the invention including a variable die opening, such variable die may comprise a fixed central piece with an outside piece movable toward and away from the fixed piece to vary the die opening. A hydraulic cylinder and piston may be interconnected between the movable outside piece of the variable die and the extruder to vary the die opening.

In the method of the present invention thermoplastic corrugated tubing is produced having a substantially uniform thickness throughout. Such method comprises the steps of extruding a hollow smooth-walled extrudate with an extruder immediately followed by forming corrugations in the extrudate with a corrugator. The important step of controlling the thickness of the extrudate being corrugated is accomplished by providing relatively thin extrudate portions during formation of the annular valley portions and relatively thick extrudate portions during formation of the annular peak and interconnecting side wall portions.

The step of controlling the thickness of the extrudate may include varying the die opening of the extruder to form an extrudate having relatively thin and thick wall dimensions. Alternatively, such step of controlling the thickness of the extrudate may include moving the extruder and the corrugator toward and away from one another with the corrugator and extruder slightly moving away from one another during formation of the annular valley portions and slightly moving toward one another during formation of the annular peak and interconnecting side wall portions.

BRIEF DESCRIPTION OF THE DRAWING

Novel features and advantages of the present invention in addition to those mentioned above will become apparent to those skilled in the art from a reading of the following detailed description in conjunction with the accompanying drawing wherein similar reference characters refer to similar parts and in which

FIG. 4 is a schematic side elevational view of apparatus similar to FIG. 1 but illustrating another form of the present invention;

FIG. 5 is an end elevational view illustrating a variable extruder die, according to the present invention;

FIG. 6 is a partial sectional view taken along line 6—6 of FIG. 5;

FIG. 7 is a top plan view of a hydraulic piston and cylinder for effecting relative movement of the corrugator and extruder either shown in FIG. 1 or 4;

FIG. 8 is a front elevational view of the timing cam shown in FIG. 1; and

FIG. 9 is a side elevational view of the timing cam shown in FIG. 8.

DETAILED DESCRIPTION OF THE INVENTION

Figure 1:
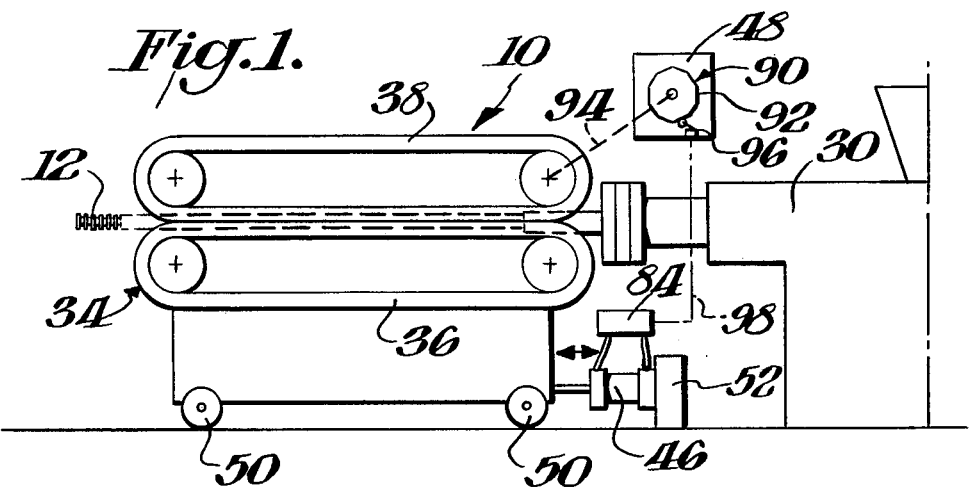
FIG. 1 is a schematic side elevational view of apparatus for producing thermoplastic corrugated tubing having a substantially uniform thickness throughout, according to the present invention.

Referring in more particularity to the present invention, FIG. 1 illustrates a machine 10 for producing thermoplastic corrugated tubing 12 having a substantially uniform thickness throughout. Before developing the specific details of the present invention, it is best to understand the prior art procedure for producing such tubing. This procedure is diagrammatically illustrated in FIG. 2 of the drawing wherein an extruder 14 forms a hollow smooth-walled extrudate 16 which is subsequently corrugated in the molding zone of corrugating structure 18. As is well known, the corrugating structure 18 includes continuously moving mold blocks 20 configured to form alternating annular peak portions 22, valley portions 24 and interconnecting side wall portions 26 in the extrudate 16. The thickness of the material at point A is much thicker than desired while the wall thickness at point B is thinner than desired. Continuing, the corners C are much thinner than desired and the peak portions at D are also thinner than desired. The thermoplastic tubing produced by the procedure diagrammatically illustrated in FIG. 2 has significant disadvantages in comparison to a product having a uniform thickness throughout. Specifically, the varying dimensions produce a product having a variable weight distribution. This produces a weaker product than one in which the amount of material is equally distributed. Secondly, the varying thickness of the tubing product produced pursuant to FIG. 2 requires a longer cooling time than a product having the same weight with a uniform thickness throughout. Relatively thin portions at 22 and 26 result from the extrudate 16 being blown over a proportionately greater area than the extrudate is blown onto the mold surfaces forming the valley portions 24.

Figure 3:
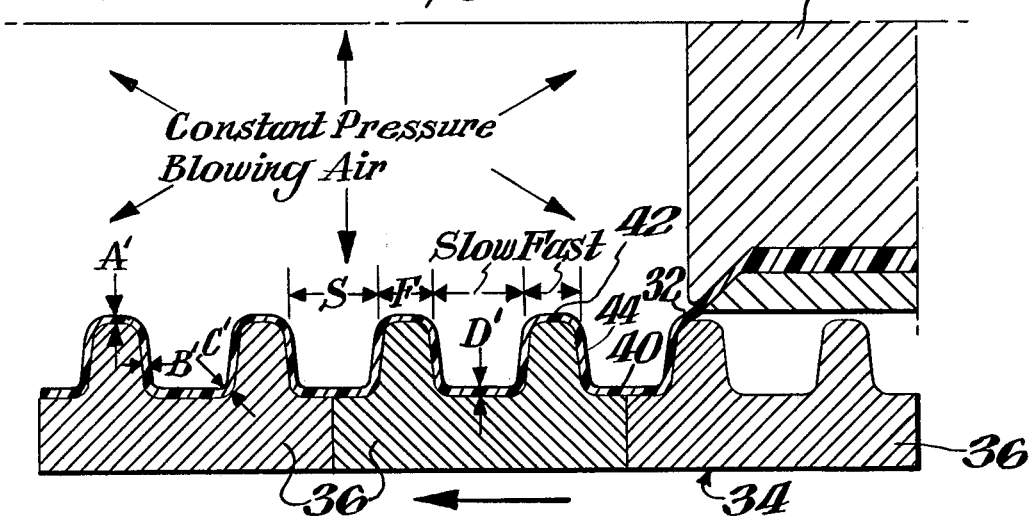
FIG. 3 is a diagrammatic view illustrating the manner in which thermoplastic corrugated tubing is manufactured in accordance with the present invention.

Returning to FIG. 1 and the diagrammatic view of FIG. 3, the machine 10 comprises an extruder 30 forming a hollow smooth-walled thermoplastic extrudate 32. Corrugating structure 34 located immediately adjacent the extruder 30 is arranged to receive the extrudate 32 and to form corrugations therein. The corrugating structure 34 includes continuously moving cooperating mold blocks 36,38 configured to form alternating annular peak portions 40, valley portions 42 and interconnecting side wall portions 44 in the extrudate 32. Differential air pressure illustrated diagrammatically in FIG. 3 functions to urge the soft extrudate 32 into intimate engagement with the configured mold blocks 36,38. It is most significant that the thickness of the extrudate being corrugated is controlled to provide relatively thin extrudate portions during formation of the annular valley portions 42 of the finished product and relatively thick extrudate portions during formation of the annular peak and interconnecting side wall portions 40 and 44, respectively.

In the embodiment of the invention illustrated in FIGS. 1 and 3, the thickness of the extrudate 32 being corrugated is controlled by a motivator 46 that selectively moves the corrugating structure 34 relative to the extruder 30 along the line of travel of the tubing 12. A timing device 48 connected to the motivating mechanism 46 causes the extruder 30 and the corrugator 34 to slightly move away from one another during formation of the annular valley portions 42 and to slightly move toward one another during formation of the annular peak and interconnecting side wall portions 40 and 44, respectively, as explained more fully below.

Figure 2:
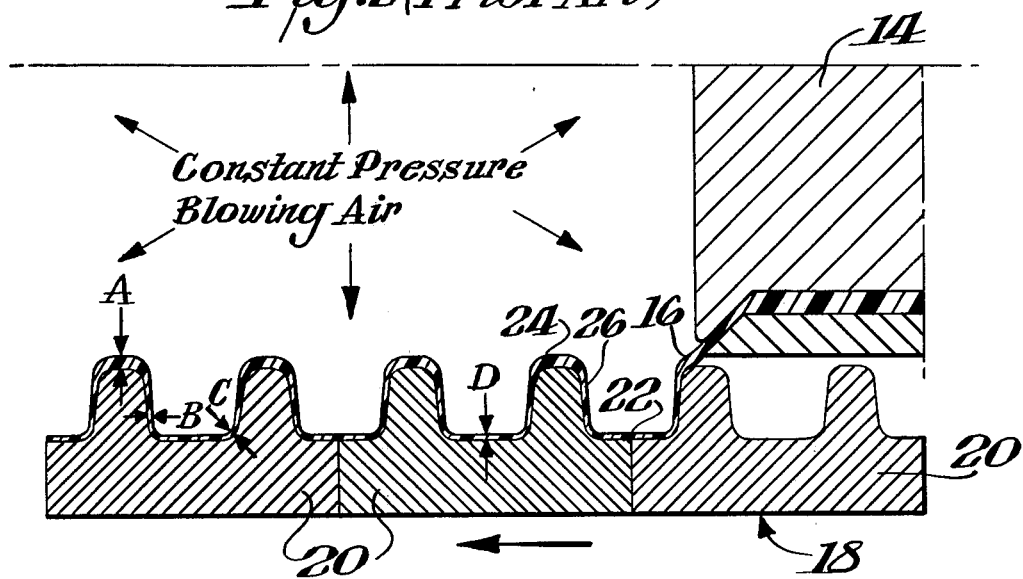
FIG. 2 is a diagrammatic view illustrating the formation of thermoplastic corrugated tubing according to methods known in the prior art.

Before explaining the particulars of the structure for providing relative movement between the extruder 30 and the corrugator 34, it is best to understand the effect of such relative movement during the corrugating step. As explained above, the corrugator is continuously moving and ordinarily when the alternating annular valley portions are formed the thickness of the material is excessive. In the embodiment of the present invention shown in FIGS. 1 and 3, when the valley portions 42 are being formed, the motivator 46 moves the corrugator 34 away from the extruder 30 which thins out the extrudate portion forming these valleys. In other words, at the time of forming the annular valley portions 42, the speed of the molds is fast relative to the extrudate. Conversely, when the annular peak portions 40 and interconnecting side wall portions 44 are being formed the motivator 46 causes the corrugator 34 to slightly move towad the extruder 30. Accordingly, at the time of forming the annular peak portions 40 and interconnecting side wall portions 44, the speed of the molds is slow relative to the extrudate. Such relative movement between the extruder 30 and the corrugator 34 produces a thinner than ordinary valley and thickner than ordinary peaks and side walls which results in corrugated tubing 12 having a substantially uniform thickness throughout. Comparing FIGS. 2 and 3, the thickness of the tubing at point A of FIG. 2 is reduced at point A' in FIG. 3. Similarly, the relatively thin walls at locations B, C and D of FIG. 2 are increased in thickness at locations B', C' and D' of FIG. 3.

In the embodiment of the invention illustrated in FIG. 1, the extruder is fixed in place and the corrugating structure 34 is arranged to repeatedly move toward and away from the extruder. In this regard the corrugating structure 34 may include wheels 50 rotatably mounted to the underside of the corrugator. Suitable rails (not shown) may be provided so that the movement of the corrugator toward and away from the extruder is maintained on a desired line.

Turning now to FIG. 4, a machine 60 produces thermoplastic corrugating tubing 12 having a substantially uniform thickness throughout. Basically, the machine 60 is similar to the machine 10 of FIG. 1 with the exception that the motivator 46 is interconnected between a stationary location 52 and the extruder 30. Specifically, in the machine 60 the corrugating structure 34 is fixed in place and the extruder 30 is arranged to repeatedly move toward and away from the corrugator 34. Wheels 62 may be rotatably mounted to the underside of the extruder 30 to assist in moving it toward and away from the corrugator. Rails (not shown) may be provided to insure proper alignment of the extruder during its movement toward and away from the corrugator.

As in the machine 10, the timing mechanism 48 causes the extruder 30 to slightly move away from the corrugator 34 during the formation of the annular valley portions 42. This results in a fast relative mold speed and a thinning out of the extrudate. Conversely, the timing mechanism 48 causes the extruder 30 to slightly move toward the corrugator 34 during formation of the annular peak and interconnecting side wall portions of the tubing 12. This results in a slow relative mold speed and thickening of the extrudate. The ultimate result is corrugated tubing having a substantially uniform thickness throughout.

FIGS. 5 and 6 illustrate a variable extrusion die 70 and a motivating mechanism 46 connected to vary the opening of the die 70 to form an extrudate having alternating relatively thin and thick wall dimensions. A timing mechanism 48 is connected to the motivator 46 and, as explained more fully below, this mechanism causes the die opening to slightly close during formation of the annular valley portions 42 and to slightly open during formation of the annular peak and interconnecting side wall portions, 40 and 44, respectively. The variable die 70 generally comprises a fixed central piece 72 and an out side piece 74 movable toward and away from the fixed piece to vary the die opening 76 formed by these two pieces. The operation of the motivator 46 and the timing mechanism 48 is the same as noted above and described in more detail below.

The motivator 46 of the machines of FIGS. 1, 4 and 6 may comprise a hydraulic cylinder 80 and piston 82. Hydraulic valve 84 of the type schematically shown in FIG. 1 functions to supply hydraulic fluid to either side of the piston which causes the mechanism to provide the above described relative motions. A frame 84 surrounds the hydraulic cylinder and piston and functions to limit the throw of the piston. Specifically, a rod 86 is connected to the cylinder 80 and the rod slides in slotted openings 88 in the surrounding frame 84. The length of the slots limits the throw of the piston and eliminates shock and damage to the piston and cylinder by limiting the throw.

As explained above, the timing mechanism 48 functions to control the motivator 46. The specifics of a particular timing mechanism are shown in FIGS. 8 and 9 wherein the mechanism is illustrated as a rotating cam 90 having ten individual cam surfaces 92. The cam 90 is directly driven by the corrugator 34 through drive 94 and each cam surface 92 is representative of a single corrugation in the finished product. Hence, when the corrugator causes the cam 90 to rotate one revolution, ten corrugations will be formed in the tubing being produced. For each corrugation being formed, the cam 90 causes the motivator 46 to move from one extreme to the other and then back to the starting position. This is accomplished through the interaction of the cam surfaces 92 and a follower switch 96 connected to the hydraulic valve 84 by line 98. This cycle is repeated for each corrugation being formed. As described in detail above, when the valley portions 42 are being formed the relative mold speed is fast (FIGS. 1 and 4) or the thickness of the extrudate 32 formed by the extruder is relatively thin (FIGS. 5 and 6). Conversely, when the annular peak portions 40 and side wall portions 44 are being formed, the relative mold speed is slow or the thickness of the extrudate 32 formed by the extruder is relatively thick. These procedures result in corrugated tubing 12 having a substantially uniform thickness throughout.

The apparatus described above produces corrugated tubing having a substantially uniform thickness throughout. Similar results may be achieved utilizing slightly different apparatus combinations. For example, a variable plastic extrusion rate may be used to control the thickness of the extrudate being corrugated. Alternatively, the variable relative speed produced by the mechanisms of FIGS. 1 and 4 may also be accomplished by a drive system that produces a variable mold speed. In such cases both the extruder and the corrugator could be fixed in place and the corrugator drive appropriately indexed to provide the desired variable mold speed. The mold speed would vary such that relatively thin extrudate portions would be provided during formation of the annular valley portions and relatively thick extrudate portions would be provided during formation of the annular peak and interconnecting side wall portions.

What is claimed:

1. Apparatus for producing thermoplastic corrugated tubing having a substantially uniform thickness throughout comprising an extruder forming a hollow smooth-walled extrudate, corrugating means immediately adjacent the extruder arranged to receive the extrudate and to form corrugations therein, the corrugating means including continuously moving cooperating mold blocks configured to form alternating annular peak portions, valley portions and interconnecting side wall portions in the extrudate, and blow means urging the extrudate into intimate engagement with the configured mold blocks, motivating means for selectively moving the corrugating means relative to the extruder along the line of travel of the tubing, and timing means connected to the motivating means arranged to cause the extruder and the corrugating means to slightly move away from one another during formation of the annular valley portions and to slightly move toward one another during formation of the annular peak and interconnecting side wall portions.

2. Apparatus for producing thermoplastic corrugated tubing having a substantially uniform thickness throughout as in claim 1 wherein the extruder is fixed in place, and the corrugating means is constructed and arranged to repeatedly move toward and away from the extruder.

3. Apparatus for producing thermoplastic corrugated tubing having a substantially uniform thickness throughout as in claim 2 including wheels rotatably mounted to the underside of the corrugating means.

4. Apparatus for producing thermoplastic corrugated tubing having a substantially uniform thickness throughout as in claim 2 wherein the motivating means for selectively moving the corrugating means relative to the extruder includes a hydraulic cylinder and piston interconnected between a fixed location and the corrugating means.

5. Apparatus for producing thermoplastic corrugated tubing having a substantially uniform thickness throughout as in claim 1 wherein the corrugating means is fixed in place, and the extruder is constructed and arranged to repeatedly move toward and away from the corrugating means.

6. Apparatus for producing thermoplastic corrugated tubing having a substantially uniform thickness throughout as in claim 5 including wheels rotatably mounted to the underside of the extruder.

7. Apparatus for producing thermoplastic corrugated tubing having a substantially uniform thickness throughout as in claim 5 wherein the motivating means for selectively moving the corrugating means relative to the extruder includes a hydraulic cylinder and piston interconnected between a fixed location and the extruder.

* * * * *